United States Patent [19]
Kopke, Sr.

[11] Patent Number: 5,918,793
[45] Date of Patent: Jul. 6, 1999

[54] WELD TEST APPARATUS AND METHOD

[76] Inventor: William Peter Kopke, Sr., 19561 W. Cambridge, Mundelein, Ill. 60060

[21] Appl. No.: 08/619,132

[22] Filed: Mar. 20, 1996

Related U.S. Application Data

[63] Continuation of application No. 08/285,198, Aug. 3, 1994, abandoned.

[51] Int. Cl.$^6$ .............................. B23K 35/38; B23K 9/095
[52] U.S. Cl. .......................... 228/103; 228/42; 228/56.5; 228/219; 219/121.23; 73/31.03
[58] Field of Search .......................... 228/42, 56.5, 103, 228/219; 219/121.23, 130.01; 73/31.03

[56] References Cited

U.S. PATENT DOCUMENTS

| | | | |
|---|---|---|---|
| 3,332,745 | 7/1967 | Bailey et al. | 73/31.03 |
| 3,429,796 | 2/1969 | Lauer | 204/195 |
| 3,767,552 | 10/1973 | Lauer | 204/195 |
| 4,358,949 | 11/1982 | MacFarland et al. | 73/31.03 |

FOREIGN PATENT DOCUMENTS

| | | | |
|---|---|---|---|
| 56-109186 | 8/1981 | Japan | 228/103 |
| 4-200977 | 7/1992 | Japan | 219/130.01 |

OTHER PUBLICATIONS

"The Art of Borescope Photography" by W.J. Lang, Materials Evaluation, from The Official Journal of the Americans Society for Nondestructive Testing, Dec. 1987, vol. 45, No. 12, pp. 1361–1365.
"Gas Tungsten Arc Welding: It's Built to Handle Titanium", from the Welding Journal, Nov. 1991.
"Gas–Tight Tubing for Semiconductors" by Brad F. Kuvin, from the Welding Design & Fabrication, Oct. 1992, pp. 31–34.
"Automated Orbital Welding Assures Purity of Tube Joints" by Rosalie Brosilow, from Welding Design & Fabrication, Oct. 1992, pp. 36–40.
"High Technology Orbital Tube and Pipe Welding Equipment Used on Pharmaceutical High–Purity Piping Installation" by Barbara K. Henon, Ph.D., from Pharmaceutical Processing, May 1993.
"Reader Q&A" by Ed Craig, from Welding Design & Fabrication, Apr. 1994, p. 61.
Product Information Sheet on GTFM Gas Turbine Flow Monitor by CRC–Evans Automatic Welding (Jan. 1992).
Product Information Sheet on Model 311 Portable Trace Oxygen Analyzer by Teledyne Analytical Instruments (Aug. 1990).
Undated Product Information Sheet on Oxygen Analyzer, Nitrogen Analyzer, and Manual Purge Control by Vacuum Atmospheres Company.
Undated Product Information Sheet on Nika Power 100 Tube Welder by System Technika Products.

*Primary Examiner*—P. Austin Bradley
*Assistant Examiner*—Jeffrey T. Knapp
*Attorney, Agent, or Firm*—Robert P. Sabath

[57] ABSTRACT

An apparatus and method are available for detecting the presence of inert gas in an enclosure isolating one side of selected weld structures being joined during welding operation. The system and method include using an inert gas detector relying upon an electric filament positioned in a separate containment connected to the first containment in order to determined whether the required purity level of inert gas has been achieved in the weld enclosure.

6 Claims, 2 Drawing Sheets

WELD TEST APPARATUS AND METHOD

RELATED APPLICATIONS

This is a continuation of application Ser. No. 08/285,198 filed on Aug. 3, 1994, now abandoned.

TECHNICAL FIELD

The field of the present invention is that of weld gas test apparatus and methods, and particularly that of weld gas test apparatus and methods for ascertaining the presence of a required concentration of inert gas in the welding atmosphere adjacent at least one side of a structure being welded.

BACKGROUND OF THE INVENTION

TIG (tungsten inert gas) welding and GTAW (gas tungsten arc welding) are welding techniques often used to join selected tubular or non-tubular pieces of low corrosion metals such as stainless steel, chrome molybdenum, nickel, titanium, and aluminum, for example.

TIG and GTAW welding requires a weld puddle atmospheric environment which is substantially shielded from non-inert gases. The elimination of non-inert gases from the surrounding atmosphere in the vicinity of the weld puddle is described as purging. There are two regions near the weld puddle that must be purged. One region is at the top of weld puddle, and this upper region is typically visible to the welder's eye. The other region is at the backside of the weld, which is not visible to the welder's eye. The welding apparatus itself will shield the exposed weld puddle visible to the eye by venting sufficient quantities of inert gas over the topside, but the backside of the weld puddle is not purged of non-inert gases by welding equipment which is typically used, because the workpiece being welded blocks the stream of inert gas from the welding equipment from reaching the backside.

The low corrosion metals typically used in TIG and GTAW welding are highly resistant to corrosion. Nonetheless, an inadequate backside purge results in detrimental carbide inclusions which may result in weld breakdown.

Quality welds are especially important in the pharmaceutical and semiconductor industries, and in other industries which utilize stainless steel or titanium pipes and tubes for selected applications. If the welds made are defective, undesired particles may be produced within the pipes or tubes. In both the pharmaceutical and semiconductor industries, submicron particles may be produced when defective welds scale or decompose. Irregularities in the pipes permit bacteria to grow and lodge within the pipes which have been defectively welded. Further, defective welds may permit leaks of toxic and poisonous gases during semiconductor processing, including such gases as arsine, silage, hydrochloric acid vapor, boron tetrachloride, and silicon tetrachloride.

Welding tubes and other workpieces according to tungsten inert gas (TIG) and gas tungsten arc (GTAW) techniques requires surrounding the weld formed in tube pieces or other pieces with a selected inert gas. Among typical inert gases are argon, helium, argon-hydrogen, argon-helium, nitrogen-hydrogen, or nitrogen. To adequately immerse sufficient portions of the workpiece being welded with inert gas, both sides of the workpiece must be provided an atmosphere of a selected inert gas or combination of gases. As noted above, the welding apparatus itself produces a stream of inert gas for application to one side (i.e., the topside) of the workpiece. When a pair of tube sections are welded together, the welding apparatus typically applies a stream of inert gas on the outer portion of the weld puddle near where the ends of the tube sections are being welded together. Additionally, a separate inert gaseous stream is applied to the interior of the tube sections being welded together, to substantially completely purge the current innertube atmosphere prior to beginning welding operation. This creates an atmosphere of inert gas on both sides of the weld puddle formed during welding operation.

For flat (or curved) solid pieces being welded together, the welding apparatus operates on one side of the adjacently disposed complementary edges of the selected workpieces being welded together, and a suitable bladder or other enclosure is constructed, by taping, for example, a sheet of substantially gaseously impermeable material onto the far side or underside of the pieces being welded. The bladder used has ingress and egress ports through which an inert purging gas will be driven. To ensure a quality weld, the purged conditions ideally exist from the beginning of welding operation and must persist during the entire welding operation and for a significant period thereafter, during which time the completed weld cools with tubes or pipes to be welded, inert gas is applied to the interior of pipe or tube sections to be welded together by connecting the end of one of the tubes or pipes to a pressurized source of inert gas.

Inert gas sources used when welding tubular, flat or curved pieces together, may have an initial charge pressure of 2000–2500 PSI. This pressure level is used to produce an inert gas flow level of approximately 25 CFH (cubic feet per hour). This flow level setting is equivalent to less than 1 PSI. (An example of less than one PSI pressure would be a person softly blowing from his or her lips.) The inert gasflow produced purges the interior of both sections of tube being welded together.

Prior to beginning purging operation in preparation for welding together two tube sections, the sections of tube will first be tack welded together, so that there will be no more than minimal leakage of inert gas through the abutting edges of tube material being welded together. It is not atypical for a volume of purging gas to be employed, which is ten times the physical volume of the tubes or the backside shielding enclosure being purged. To reduce purge gas leakage incident to welding flat or curved pieces, a shielding bladder may be taped over the backsides of the selected pieces, and a sufficient volume of inert purging gas is applied to ensure complete purging operation. A successful purge reduces the presence of oxygen to no more than about 25 parts per million at the weld site.

Although the art of TIG and GTAW welding has been known for years, an acceptably economical method for providing a complete inert gas purge for the entire weld puddle has not been developed. Current methods include (1) providing a mathematically precalculated volume of inert gas at a sufficient purge pressure a period of time presummed adequate to accomplish purge operation; (2) applying the purge gas and then checking the outlet of the tube or bladder for non-inert oxygen concentrations by lighting a match to see if the purge flow snufs it out; insuring observation of a lit match at the purge vent location and watching for the match to be extinguished; and (3) using an oxygen analyzer to assess the level of inertness of the weld puddle gaseous environment.

However, use of lighted matches to determine the presence of certain non-inert gases is generally undesirable and unreliable. Use of a formula method to mathematically project the establishment of a substantially completely inert atmosphere is generally uneconomical and unduly slow. In particular, the formula method cannot account for openings that are not sealed and cannot account for poor quality inert gas as bottle nears being empty, nor for poor quality gas from suppliers.

Better approaches to ensuring a reliable purge atmosphere on both sides of the weld position are clearly desired. Quality assurance and quality control have become critical factors in the manufacturing industry. More and more, nondestructive testing such as the borescope (a fiber optic inspection tool) are being used to visually inspect welds from the backside. These techniques are increasingly pervasive in the food, pharmaceutical, cosmetic, and chemical industries.

SUMMARY OF INVENTION

According to the present invention, the integrity of an inert gas flow at the backside of a weld site incident to welding operation is ascertainable. A weld gas test apparatus according to the present invention includes an electrically responsive inert weld gas sensor which radiates light in response to electric current and which produces gaseously suspended carbon particles in the presence of certain non-inert gases such as oxygen. The electrically responsive inert gas sensor is mounted in a test containment structure having at least a single inlet port and at least a single outlet port. One embodiment of the present invention includes providing a source of inert gas to a selected weld site, either at the abuttment and interior of a set of tube sections to be welded together, or at the backside of first and second flat or curved workpiece sections to be joined together by welding. The present invention includes transporting the inert gas over at least one side of the weld site toward an outlet of either the second of two pipes or tubes being welded together or of a bladder enclosure or the like filled with inert gas which is applied to the weld site at its backside. After departure of the purge gas at the gas outlet of the selected enclosure, the atmosphere in the shielding enclosure being purged enters a test containment structure in connection with which may be mounted a flow indicator and an electrically responsive inert gas sensor, which may be an electrically conductive filament or other arrangement sensitive to the presence of non-inert gases and which may produce light in response to the passage of electric current. The flow indicator ensures that the weld region is being purged by a particular level of inert purge gas. The filament has an electric current passing through it from a power source, such as a battery. If non-inert gases such as oxygen are present in the atmosphere of the test containment chamber, the electrically responsive inert gas sensor will cause carbon particles to become gaseously suspended within the test containment chamber and will eventually collect on the viewing platen. A lack of carbon particle discharge is an indication that the atmosphere within the test containment structure, and accordingly the atmosphere at the secondary weld site, is free of contaminants, thus ensuring a quality weld at least from the perspective of no corruption being caused by lack of proper purging during and after welding operation and cool-down.

DETAILED DESCRIPTION OF THE PREFERRED EMBODIMENTS

Figure 1:
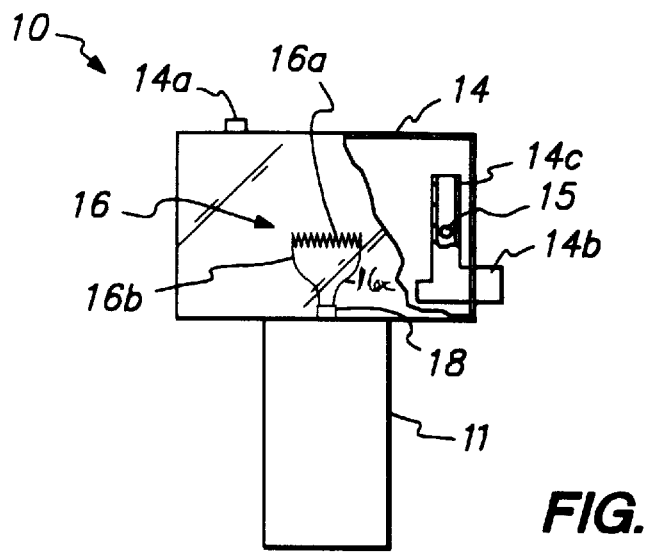
FIG. 1 shows a weld gas test apparatus according to the present invention.

FIG. 1 shows a weld test apparatus 10 according to the present invention, comprising a base containment 11 for holding a power source (not shown) such as a battery for example. Base containment 11 may be cylindrical or box shaped, and may be hermetically sealed, although this is not critical. It is preferred that base containment 11 provide structural protection for the power source held therein. Other power sources which are not completely contained within base containment 11 may be employed in connection with the present invention. Weld test apparatus 10 further includes a gas containment structure 14 which, at least in part, is preferably transparent to an external viewer and translucent to the passage of light therethrough. Gas containment structure 14 may for example be constructed of a selected plastic material formed into the shape of a hollow cylinder having a central upright axis, for example, which may be coincident with the axis of the base containment 11, according to one embodiment of the present invention. According to the cylindrical embodiments of base containment 11 and gas containment structure 14, these are cylindrical objects fabricated to have curved sides and flat tops and bottoms, with the bottom of gas containment structure 14 mounted onto the top of base containment 11. According to one embodiment, a circular hole can be cut through the bottom of gas containment structure 14, and base containment 11 may be inserted therethrough, for example. Base containment 11 and gas containment structure 14 can then be joined to each other conventionally, by tape or glue for example. Alternatively, base containment 11 may be provided with threads to permit base containment 11 to be secured into gas containment structure 14 through a circular hole in its bottom surface by screwing the base containment 11 into place through the hole fabricated in the underside of gas containment structure 14.

According to the embodiment of the present invention shown in FIG. 1, weld test apparatus 10 includes a filament 16 and a filament base 18 for mounting filament base 18 within oxygen test arrangement 10. Filament 16 may be a lighting filament from a typical consumer lighting appliance, for example. According to one embodiment, filament 16 may be a 12 volt filament from the back-up light of a motor vehicle, such as heavyduty filaments #1156 or #1157. Filament 16 may have a zigzag horizontal portion 16a and first and second vertical arms 16b and 16c for applying electric current through horizontal portion 16a when applied from the power source in base containment 11. Filament base 18 may for example be mounted on the bottom of gas containment structure 14 or on the top of base containment 11 in the case in which a hole has been cut in the bottom of base containment structure 14 for insertion therethrough of base containment 11. Filament base 18 is made of an electrically insulative material, such as plastic for example, which according to one embodiment thereof, may be a solid cylinder having parallel axially directed holes fabricated therethrough for receiving the passage therethrough of first and second arms 16b and 16c of filament 16 for selectable connection to positive and negative terminals of the power supply in base containment 11. A switch (not shown) can be inserted to open and close the circuit formed by the connection of the power supply and filament 16. Filament base 18 is inserted through the bottom of gas containment structure 14 and the top of base containment 11. However, according to the embodiment in which base containment 11 is inserted through a hole in the bottom of gas containment structure 14, filament base 18 may not physically contact the actual structure of gas containment structure 14. Nonetheless, by passing through the plane level of the bottom of gas containment structure 14, it is correct to say that according to one embodiment of the present invention, filament base 18 is inserted through the bottom of gas containment structure 14. According to an alternate embodiment of the present invention, base containment 11 extends sufficiently into the interior of gas containment structure, so that filament base 18 does not extend through the bottom of gas containment structure 14. The present invention includes having filament base 18 serve as a discrete and separate component mounted within either both base containment 11 and gas containment structure 14 or at least one of them. The present invention further includes forming a unitary structure which combines filament base 18 and base containment 11, or filament base 18 and gas containment structure 14. Further according to the present invention, gas containment structure 14 includes inlet and exit ports respectively 14b and 14a.

Figure 2:
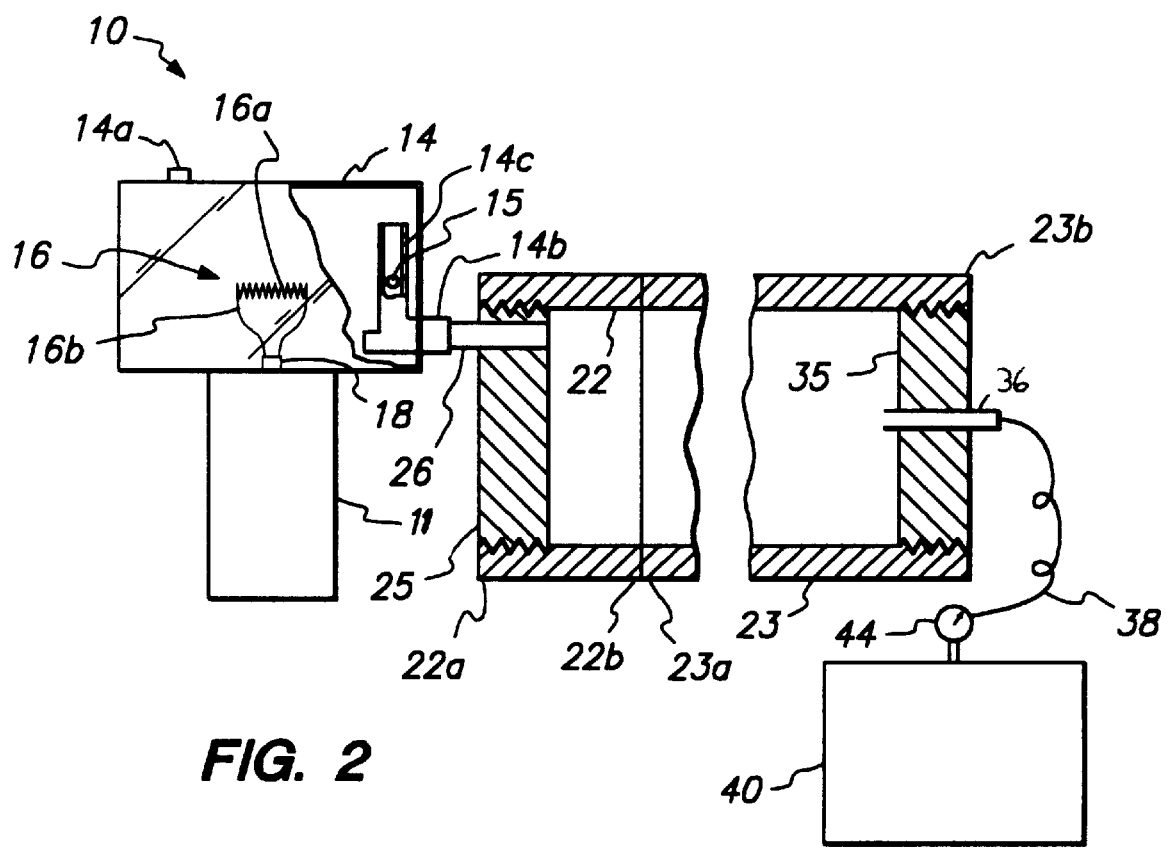
FIG. 2 shows the weld gas test apparatus according to FIG. 1 connected to first and second tubes subject to welding operation at abutting edges thereof, the weld gas test arrangement being connected to one of said first and second tubes through a plug fixture having a gas outlet extending therethrough along a line parallel to the axis of the plug fixture.

FIG. 2 shows weld test apparatus 10 according to FIG. 1 connected through inlet port 14b to first and second tube sections 22 and 23. Tube section 22 includes first and second edges respectively 22a and 22b. Tube section 23 includes first and second edges respectively 23a and 23b. In preparation for welding operation, tube sections 22 and 23 are tack welded together at edges 22b and 23a. These edges 22b and 23a are subject to welding operation once the interior spaces of tube sections 22 and 23 have been purged of the ambient oxygen laden atmosphere. Inert gas test arrangement 10 is accordingly connected either to tube section 22 or tube section 23 to permit testing of an adequate level of purging within tube sections 22a and 22b prior to, during, and after performance of welding operation. According to an embodiment of the present invention, inert gas test arrangement 10 includes a plug fixture 25 and a connection tube 26. Connection tube 26 is coupled to inlet port 14b of gas containment structure 14. According to one embodiment of the present invention, coupling between connection tube 26 and inlet port 14b is accomplished by establishing a frictional connection according to which connection tube 26 is a flexible tube of soft plastic inserted into inlet port 14b. Plug fixture 25 has a gas outlet extending therethrough along a line parallel to the axis of plug fixture 25 and tube sections 22 and 23. According to one embodiment of the present invention, plug fixture 25 is cylindrical and threaded along its outer diameter. The inner diameter of a first edge 22a of tube section 22 is complementarily threaded, permitting plug fixture 25 to be threadingly inserted and secured within edge 22a of tube section 22. According to alternate embodiments of the present invention, plug fixture 25 is not threaded, but may nonetheless effectively serve the purpose of such a plug fixture according to the present invention, which is to funnel exodus of gas within tube sections 22 and 23 into connection tube 26 and inlet port 14b for testing as to inert gas content. According to an embodiment of the present invention, inert gas test arrangement 10 includes a plug fixture 35 including an inlet port 36 defined in plug fixture 35, a connection tube 38 for providing inert purge gas to inlet port 36, a source of inert gas 40, and a gas valve and gauge 44. Connection tube 38 is coupled to an inlet port 36 of plug fixture 35. According to one embodiment of the present invention, coupling between connection tube 38 and inlet port 36 is accomplished by establishing a frictional connection according to which connection tube 38 is a flexible tube of soft plastic inserted into inlet port 36. Plug fixture 35 has a gas outlet extending therethrough along a line parallel to the axis of plug fixture 35 and tube sections 22 and 23. According to one embodiment of the present invention, plug fixture 35 is cylindrical and threaded along its outer diameter. The inner diameter of a first edge 23b of tube section 23 is complementarily threaded, permitting plug fixture 35 to be threadingly inserted and secured within edge 23b of tube section 23. According to alternate embodiments of the present invention, plug fixture 35 is not threaded, but may nonetheless effectively serve the purpose of such a plug fixture according to the present invention, which is to funnel gas into tube sections 22 and 23 from inert gas source 40. Gas valve and gauge 44 are employed to control and monitor the flow of gas departing from gas source 40.

Figure 3:
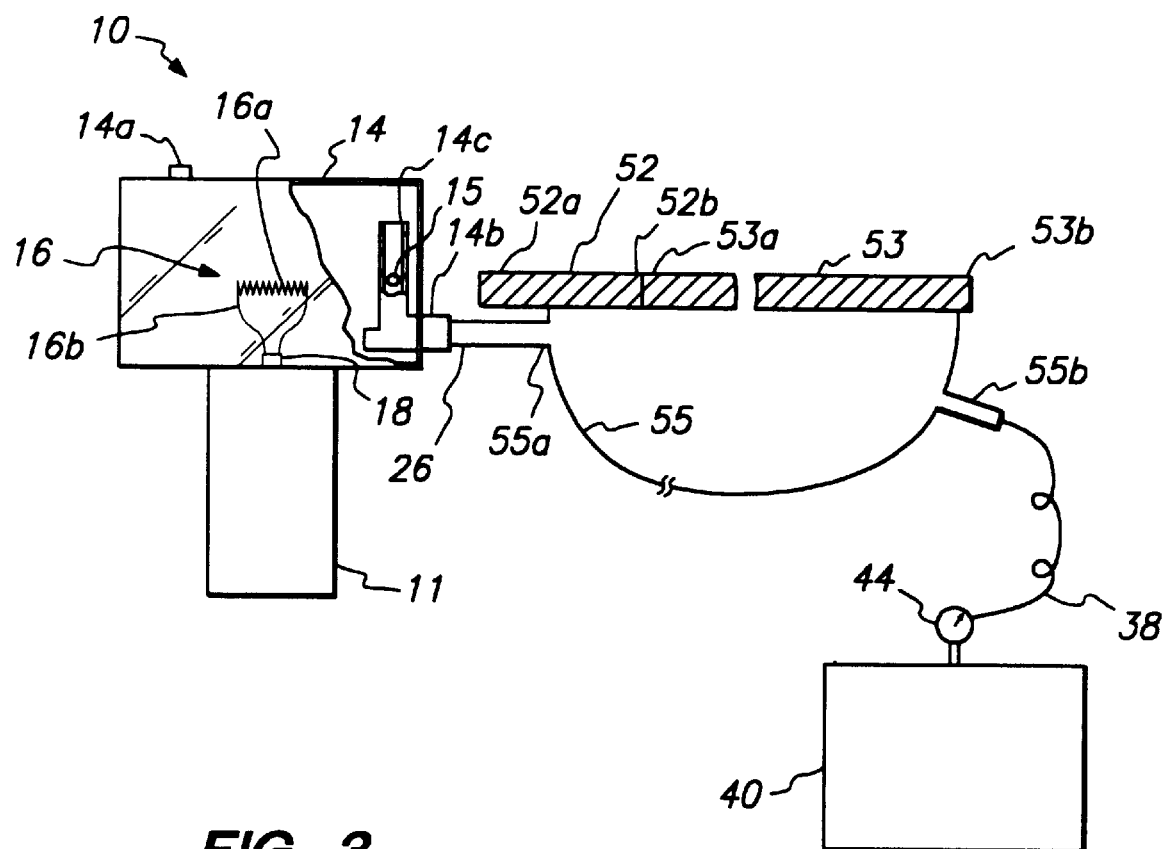
FIG. 3 shows the weld test apparatus according to FIG. 1 connected to a flexible bladder sealingly attached to the backside of first and second panels subject to welding operation at abutting edges thereof, the weld gas test arrangement being connected to the exit port of the bladder.

FIG. 3 shows the inert gas test arrangement 10 according to FIG. 1 connected to a flexible bladder 55 sealingly attached to the backside of first and second panels 52 and 53. Panels 52 and 53 include respective first and second edges 52a and 52b, and 53a and 53b. Panels 52 and 53 are subject to welding operation at abutting edges 52b and 53a thereof, inert gas test arrangement 10 being connected to exit port 55a of bladder 55. In preparation for welding operation, panels 52 and 53 are tack welded together at edges 52b and 53a. These edges 52b and 53a are subject to welding operation once the interior spaces of bladder 55 have been purged of the ambient atmosphere. Inert gas test arrangement 10 is accordingly connected to bladder 55 to permit testing of an adequate level of purging within bladder 55 prior to, during, and after performance of welding operation. According to an embodiment of the present invention, inert gas test arrangement 10 includes bladder 55 and connection tube 26. Connection tube 26 is coupled to inlet port 14b of gas containment structure 14. According to one embodiment of the present invention, coupling between connection tube 26 and inlet port 14b is accomplished by establishing a frictional connection according to which connection tube 26 is a flexible tube of soft plastic inserted into inlet port 14b. According to an embodiment of the present invention, inert gas test arrangement 10 includes inlet port 55b, connection tube 38 for providing inert purge gas to inlet port 55b, a source of inert gas 40, and a gas valve and gauge 44. Connection tube 38 is coupled to an inlet port 55b of bladder 55. According to one embodiment of the present invention, coupling between connection tube 38 and inlet port 55b is accomplished by establishing a frictional connection according to which connection tube 38 is a flexible tube of soft plastic inserted into inlet port 55b. Gas valve and gauge 44 are employed to control and monitor the flow of gas departing from gas source 40.

In use, the weld test apparatus 10 employs an inert gas detector to determine the substantial absence of non-inert gases in the enclosure of bladder 55 or tube sections 22 and 23, as the case may be. A source of inert gas 40 applies a stream of inert gas through both bladder 55 and gas containment structure 14 of weld test apparatus 10 or both tube sections 22 and 23 and gas containment structure 14 of weld test apparatus 10. The stream of inert gas passes from source 40 through connection tube 38 and into bladder 55 or tube sections 22 and 23. The inert gas thus purges the former atmosphere within bladder 55 or tube sections 22 and 23. The former atmosphere typically contains a mixture of inert and non-inert gases. The gas stream continues from bladder 55 or tube sections 22 and 23 through weld test apparatus 10, ultimately purging all non-inert gas from both bladder 55 or tube sections 22 and 23 and weld test apparatus 10. Purging continues and at a particular time the welder (not shown) will decide to test whether the mixed inert and non-inert atmosphere within bladder 55 or tube sections 22 and 23 and gas containment structure 14 of weld test apparatus 10 has been completely or sufficiently purged.

At this time, the welder will connect electric power to induce an electric current to flow though filament 16. The flow of electric current through filament 16 will cause emission of photons, i.e., the production of light. The illumination is particularly bright if the atmosphere within gas containment structure 14 is substantially completely depleted or purged by inert gas with hardly any non-inert gas remaining within gas containment structure 14. In the event that some non-inert gas remains (typically trace oxygen or more than trace amounts of oxygen), gas-suspended carbon particles (i.e., smoke) will begin to form. These carbon particles may settle out of the gas in which they are suspended to adhere to the interior walls of gas containment structure 14.

There are several indicators of an insufficiently inert atmosphere at the weld site and in gas containment structure 14: (1) production of smoke and carbon particles, and (2) diminished illumination from filament 16.

What is claimed is:

1. A method for determining whether the gaseous environment of at least a portion of the site of inert gas welding is substantially completely inert, the method employing an inert gas detector having an electrically responsive inert gas sensor which radiates light in response to electric current and which produces smoke in the presence of non-inert gas, and a containment mounting the electrically responsive inert gas sensor, the method including the steps of:

coupling said inert gas detector to a weld site enclosure which encloses at least a portion of the atmosphere adjacent a selected welding location at which complementary metal pieces are to be welded together;

coupling said weld site enclosure to a source of inert gas at a side of said weld enclosure removed from the coupling with said inert gas detector;

establishing a flow of inert gas from said source of inert gas and through said inert gas detector;

detecting an adequate level of said flow of an inert gas through the inert gas detector both mechanically and chemically; and activating said inert gas detector with electric power to detect whether the atmosphere in said weld site enclosure is adequately purged of non-inert gases.

2. An inert gas detector for use in inert gas welding to ascertain the presence of a substantially completely inert gaseous environment, comprising:

an electrically responsive inert gas sensor, which radiates light in response to electric current and which provides smoke in the presence of non-inert gas, having first and second ends;

means for selectively providing electric power to said electrically responsive inert gas sensor; and containment means for receiving passage there through of a stream of gas from a weld shield enclosure for at least a portion of the site of inert gas welding operation, said containment means-holding said electrically responsive inert gas sensor, and said means for selectively providing electric power being mounted on said containment means.

3. The inert gas detector according to claim 2, further comprising a flow indicator for indicating the level of gaseous flow through said containment means.

4. The inert gas detector according to claim 2, further comprising a weld shield enclosure for gaseously isolating at least one side of first and second metallic surfaces to be welded in an inert gaseous environment.

5. The inert gas detector according to claim 4, wherein said containment means includes first and second ports at least one of which includes a flow meter.

6. The inert gas detector according to claim 5, wherein said weld shield enclosure includes first and second sides and is connected to a source of inert gas at said first side and to said containment means at said second side.

* * * * *